United States Patent
Sakurai et al.

(10) Patent No.: US 9,647,469 B2
(45) Date of Patent: May 9, 2017

(54) CHARGE AND DISCHARGE CONTROL CIRCUIT, CHARGE AND DISCHARGE CONTROL UNIT, AND BATTERY DEVICE

(71) Applicant: Seiko Instruments Inc., Chiba-shi, Chiba (JP)

(72) Inventors: Atsushi Sakurai, Chiba (JP); Fumihiko Maetani, Chiba (JP)

(73) Assignee: SII Semiconductor Corporation (JP)

( * ) Notice: Subject to any disclaimer, the term of this patent is extended or adjusted under 35 U.S.C. 154(b) by 204 days.

(21) Appl. No.: 14/189,451

(22) Filed: Feb. 25, 2014

(65) Prior Publication Data

US 2014/0239909 A1    Aug. 28, 2014

(30) Foreign Application Priority Data

Feb. 26, 2013   (JP) .................... 2013-036207

(51) Int. Cl.
*H02J 7/00*   (2006.01)
*H02J 7/14*   (2006.01)

(52) U.S. Cl.
CPC .......... *H02J 7/0029* (2013.01); *H02J 7/0031* (2013.01); *H02J 7/007* (2013.01); *H02J 7/0011* (2013.01); *H02J 7/0072* (2013.01); *H02J 2007/0039* (2013.01)

(58) Field of Classification Search
USPC ....... 320/134, 107, 112, 126, 132, 135, 136, 320/154, 157, 164, 128, 150, 152, 158, 320/159, 162, 163; 324/426, 433
See application file for complete search history.

(56) References Cited

U.S. PATENT DOCUMENTS

| | | | |
|---|---|---|---|
| 5,742,148 A | 4/1998 | Sudo et al. | |
| 5,789,902 A | 8/1998 | Abe et al. | |
| 5,936,384 A * | 8/1999 | Fujiwara | H02J 7/0031 320/112 |
| 6,242,890 B1 | 6/2001 | Sudo et al. | |
| 6,316,915 B1 * | 11/2001 | Fujiwara | H02J 7/0031 320/134 |
| 6,331,763 B1 | 12/2001 | Thomas et al. | |
| 6,879,133 B1 | 4/2005 | Geren | |
| 2002/0050806 A1* | 5/2002 | Fujiwara | H02J 7/0031 320/136 |
| 2002/0079869 A1* | 6/2002 | Fujiwara | H02J 7/0031 320/157 |
| 2008/0018304 A1 | 1/2008 | Litingtun et al. | |
| 2008/0036422 A1* | 2/2008 | Sakurai | H02J 7/0031 320/134 |
| 2009/0102435 A1 | 4/2009 | Iwasaki et al. | |
| 2009/0121683 A1* | 5/2009 | Goto | H01M 10/48 320/134 |

(Continued)

FOREIGN PATENT DOCUMENTS

JP    2004-104956 A    4/2004

*Primary Examiner* — Alexis A Boateng
(74) *Attorney, Agent, or Firm* — Brinks Gilson & Lione

(57) ABSTRACT

Provided is a highly safe battery device in which the accuracy of an overcurrent detection current value is high. A charge and discharge control circuit includes an overcurrent detecting terminal, an overcurrent detecting circuit for detecting overcurrent of a secondary battery, the overcurrent detecting circuit being connected to the overcurrent detecting terminal, and a constant current circuit for causing a current to flow to the overcurrent detecting terminal.

2 Claims, 6 Drawing Sheets

(56) References Cited

U.S. PATENT DOCUMENTS

| | | |
|---|---|---|
| 2009/0315515 A1 | 12/2009 | Yu et al. |
| 2010/0090652 A1* | 4/2010 | Takeda ............... H01M 10/443 |
| | | 320/134 |
| 2010/0201327 A1* | 8/2010 | Takeda ................ H01M 2/34 |
| | | 320/154 |
| 2012/0229945 A1* | 9/2012 | Sakurai ................ H02H 3/08 |
| | | 361/86 |
| 2013/0049779 A1 | 2/2013 | Berkhout |
| 2013/0187615 A1* | 7/2013 | Kimura ............... H02J 7/0031 |
| | | 320/134 |
| 2013/0200847 A1 | 8/2013 | Kurokawa et al. |
| 2013/0229144 A1* | 9/2013 | Nagata ................ H02J 7/0072 |
| | | 320/107 |
| 2014/0139143 A1 | 5/2014 | Navabi-Shirazi et al. |
| 2014/0239909 A1 | 8/2014 | Watanabe et al. |
| 2014/0253044 A1 | 9/2014 | Maetani et al. |

* cited by examiner

CHARGE AND DISCHARGE CONTROL CIRCUIT, CHARGE AND DISCHARGE CONTROL UNIT, AND BATTERY DEVICE

RELATED APPLICATIONS

This application claims priority under 35 U.S.C. §119 to Japanese Patent Application No. 2013-036207 filed on Feb. 26, 2013, the entire content of which is hereby incorporated by reference.

BACKGROUND OF THE INVENTION

1. Field of the Invention

The present invention relates to a battery device including a charge and discharge control unit for detecting a voltage and abnormality of a secondary battery to control charge and discharge of the secondary battery, and more particularly, to a charge and discharge control circuit, a charge and discharge control unit, and a battery device that are capable of preventing a battery from entering an abnormal state or preventing an excessive current from flowing through a battery or an apparatus connected to the battery.

2. Description of the Related Art

FIG. 6 is a circuit diagram illustrating a related-art battery device. The related-art battery device includes a secondary battery 11, an N-channel discharge control field effect transistor 12, an N-channel charge control field effect transistor 13, a charge and discharge control circuit 14, resistors 22 and 31, a capacitor 32, and external terminals 20 and 21. The charge and discharge control circuit 14 includes a control circuit 15, an overcurrent detecting circuit 16, an overcurrent detecting terminal 19, a charge control signal output terminal 41, a discharge control signal output terminal 42, a DS terminal 45, a positive electrode power supply terminal 44, and a negative electrode power supply terminal 43. The overcurrent detecting circuit 16 includes a comparator circuit 18 and a reference voltage circuit 17.

The control circuit 15 includes resistors 504, 505, 506, 507, 518, and 528, reference voltage circuits 509, 515, and 516, comparator circuits 501, 508, 513, and 514, an oscillator circuit 502, a counter circuit 503, a logic circuit 510, a level shift circuit 511, a delay circuit 512, a logic circuit 520, and NMOS transistors 517 and 519.

Next, an operation of the related-art battery device is described. When a load is connected between the external terminals 20 and 21 and a current flows, a potential difference is generated between a negative electrode of the secondary battery 11 and the external terminal 21. This potential difference is determined based on a current amount I1 flowing between the external terminals 20 and 21, a resistance value R12 of the N-channel discharge control field effect transistor 12, and a resistance value R13 of the N-channel charge control field effect transistor 13, and is represented by I1×(R12+R13). A voltage of the overcurrent detecting terminal 19 is equal to a voltage of the external terminal 21. The comparator circuit 18 compares a voltage of the reference voltage circuit 17 with the voltage of the overcurrent detecting terminal 19. When the voltage of the overcurrent detecting terminal 19 is higher, the N-channel discharge control field effect transistor 12 is turned off for overcurrent protection. A setting value of an overcurrent detection current value is represented by IDOP, a voltage of the reference voltage circuit 17 is represented by V17, a resistance value of the N-channel discharge control field effect transistor 12 is represented by R12, and a resistance value of the N-channel charge control field effect transistor 13 is represented by R13. A voltage of the external terminal 21 as a threshold voltage for the comparator circuit 18 to output a detection signal is V17. At this time, the current flowing between the external terminals 20 and 21 is obtained by dividing the voltage of the external terminal 21 by the sum of the resistance values of the N-channel discharge control field effect transistor 12 and the N-channel charge control field effect transistor 13, and is represented by IDOP=V17/(R12+R13).

However, the related art has a problem in that, due to fluctuations in a resistance value of a charge and discharge control switch and fluctuations in the overcurrent detecting circuit, the overcurrent detection current value is low in accuracy to reduce the safety of the battery device.

SUMMARY OF THE INVENTION

The present invention has been made to solve the above-mentioned problem, and provides a highly safe battery device that is capable of adjusting an overcurrent detection current value after a charge and discharge control circuit and a charge and discharge control switch are combined with each other, in which the accuracy of the overcurrent detection current value is improved.

In order to solve the related-art problem, a charge and discharge control circuit according to one embodiment of the present invention has the following configuration.

The charge and discharge control circuit includes: an overcurrent detecting terminal; an overcurrent detecting circuit for detecting overcurrent of a secondary battery, the overcurrent detecting circuit being connected to the overcurrent detecting terminal; and a constant current circuit for causing a current to flow to the overcurrent detecting terminal.

According to one embodiment of the present invention, it is possible to provide the following battery device. After the charge and discharge control circuit and a charge and discharge control switch are combined with each other, a resistance value of a resistor inside the battery device is changed, and thus an overcurrent detection current value may be adjusted. The resistance value of the resistor is optimized with respect to fluctuations in the resistance value of the charge and discharge control switch and the overcurrent detecting circuit, and thus the accuracy of the overcurrent detection current value may be improved and the safety of the battery device may be enhanced.

DETAILED DESCRIPTION OF THE PREFERRED EMBODIMENTS

Now, embodiments of the present invention are described with reference to the drawings.

Embodiments

First Embodiment

Figure 1:
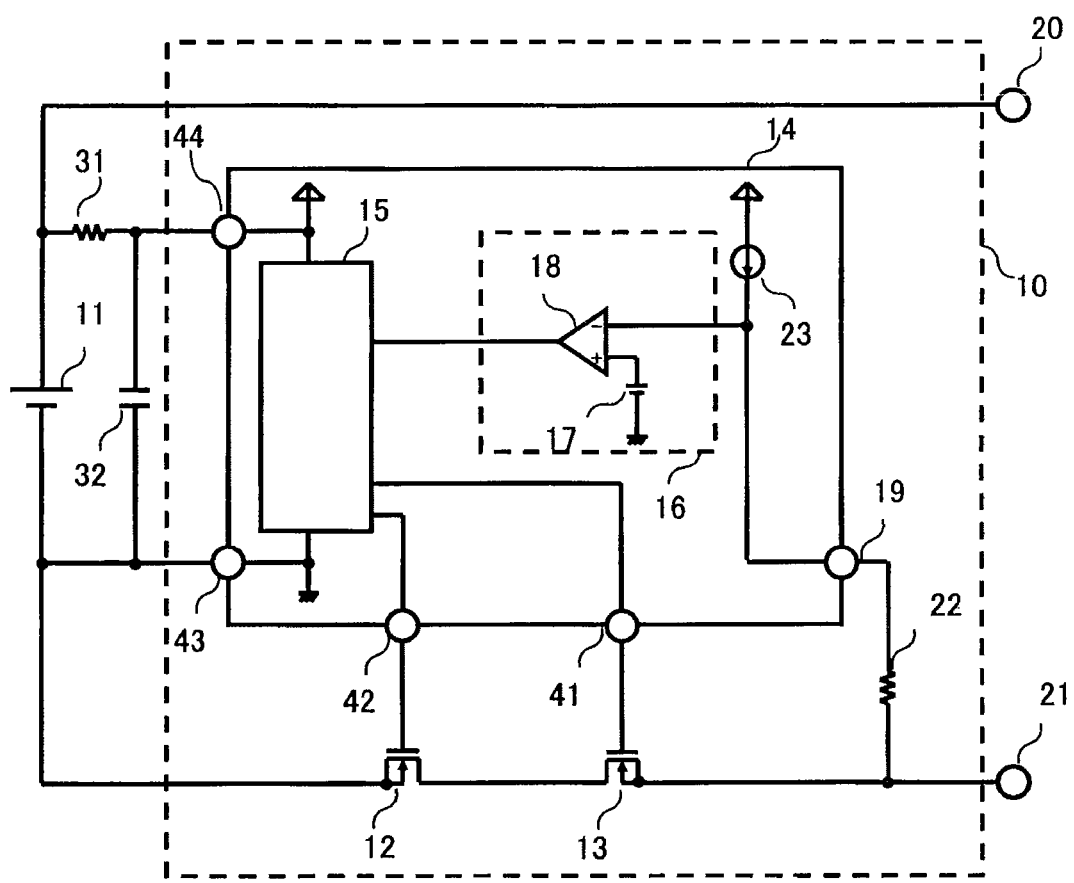
FIG. 1 is a circuit diagram of a battery device according to a first embodiment of the present invention.

FIG. 1 is a circuit diagram of a battery device according to a first embodiment of the present invention.

The battery device of the first embodiment includes a secondary battery 11, a resistor 31, a capacitor 32, a charge and discharge control unit 10, and external terminals 20 and 21. The charge and discharge control unit 10 includes an N-channel discharge control field effect transistor 12, an N-channel charge control field effect transistor 13, a charge and discharge control circuit 14, and a resistor 22. The charge and discharge control circuit 14 includes a control circuit 15, an overcurrent detecting circuit 16, a constant current circuit 23, an overcurrent detecting terminal 19, a charge control signal output terminal 41, a discharge control signal output terminal 42, a positive electrode power supply terminal 44, and a negative electrode power supply terminal 43. The overcurrent detecting circuit 16 includes a comparator circuit 18 and a reference voltage circuit 17.

The secondary battery 11 has a positive electrode connected to the external terminal 20 and the resistor 31, and a negative electrode connected to the capacitor 32, the negative electrode power supply terminal 43, and a source and a back gate of the N-channel discharge control field effect transistor 12. The positive electrode power supply terminal 44 is connected to a node of the resistor 31 and the capacitor 32. The N-channel discharge control field effect transistor 12 has a gate connected to the discharge control signal output terminal 42, and a drain connected to a drain of the N-channel charge control field effect transistor 13. The N-channel charge control field effect transistor 13 has a gate connected to the charge control signal output terminal 41, and a source and a back gate connected to the external terminal 21 and one terminal of the resistor 22. The other terminal of the resistor 22 is connected to the overcurrent detecting terminal 19. The comparator circuit 18 has an inverting input terminal connected to one terminal of the constant current circuit 23 and the overcurrent detecting terminal 19, a non-inverting input terminal connected to one terminal of the reference voltage circuit 17, and an output terminal connected to the control circuit 15. The other terminal of the reference voltage circuit 17 is connected to the negative electrode power supply terminal 43, and the other terminal of the constant current circuit 23 is connected to the positive electrode power supply terminal 44. The control circuit 15 has a first input connected to the positive electrode power supply terminal 44, a second input connected to the negative electrode power supply terminal 43, a first output connected to the charge control signal output terminal 41, and a second output connected to the discharge control signal output terminal 42.

Next, an operation of the battery device of the first embodiment is described. When a load is connected between the external terminals 20 and 21 and a discharge current flows, a potential difference is generated between the negative electrode of the secondary battery 11 and the external terminal 21. This potential difference is determined based on a current amount I1 flowing between the external terminals 20 and 21, a resistance value R12 of the N-channel discharge control field effect transistor 12, and a resistance value R13 of the N-channel charge control field effect transistor 13, and is represented by I1×(R12+R13).

The current of the constant current circuit 23 flows through a path starting from the positive electrode of the secondary battery via the resistor 31, the positive electrode power supply terminal 44, the overcurrent detecting terminal 19, the resistor 22, the N-channel charge control field effect transistor 13, and the N-channel discharge control field effect transistor 12 to reach the negative electrode of the secondary battery. Therefore, the overcurrent detecting terminal 19 has a voltage obtained by adding, to the voltage of the external terminal 21, a voltage generated when the current from the constant current circuit 23 flows through the resistor 22. The comparator circuit 18 compares a voltage of the reference voltage circuit 17 with a voltage of the overcurrent detecting terminal 19. When the voltage of the overcurrent detecting terminal 19 is higher, the comparator circuit 18 outputs a detection signal to the control circuit 15 to turn off the N-channel discharge control field effect transistor 12 for overcurrent protection.

A setting value of an overcurrent detection current value is represented by IDOP, a voltage of the reference voltage circuit 17 is represented by V17, a current value of the constant current circuit 23 is represented by I23, a resistance value of the resistor 22 is represented by R22, a resistance value of the N-channel discharge control field effect transistor 12 is represented by R12, and a resistance value of the N-channel charge control field effect transistor 13 is represented by R13. A voltage of the external terminal 21 as a threshold voltage for the comparator circuit 18 to output a detection signal is represented by V17−(I23×R22). At this time, the current flowing between the external terminals 20 and 21 is obtained by dividing the voltage of the external terminal 21 by the sum of the resistance values of the N-channel discharge control field effect transistor 12 and the N-channel charge control field effect transistor 13, and is represented by IDOP=(V17−(I23×R22))/(R12+R13). From this expression, it is understood that the setting value IDOP of the overcurrent detection current value can be adjusted by changing the resistance value R22 of the resistor 22. In this manner, the resistance value R22 of the resistor 22 is optimized so that IDOP becomes the setting value with respect to fluctuations of the voltage V17 of the reference voltage circuit 17, the resistance value R12 of the N-channel discharge control field effect transistor 12, and the resistance value R13 of the N-channel charge control field effect transistor 13. Thus, the accuracy of the overcurrent detection current value of the battery device can be improved.

Note that, the N-channel discharge control field effect transistor 12 and the N-channel charge control field effect transistor 13 are used in the description, but the present invention is not limited to this configuration. It is needless to say that, even when P-channel field effect transistors are used, and the constant current circuit 23 is connected to the negative electrode power supply terminal 43 instead of the positive electrode power supply terminal 44, a similar operation is enabled. Further, it is apparent that, even when merely the battery discharge current is controlled or when merely the battery charge current is controlled, the present invention is applicable.

As described above, in the battery device of the first embodiment, the resistance value of the resistor 22 is optimized, to thereby improve the accuracy of the overcurrent detection current value of the battery device and enhance the safety of the battery device.

Second Embodiment

Figure 2:
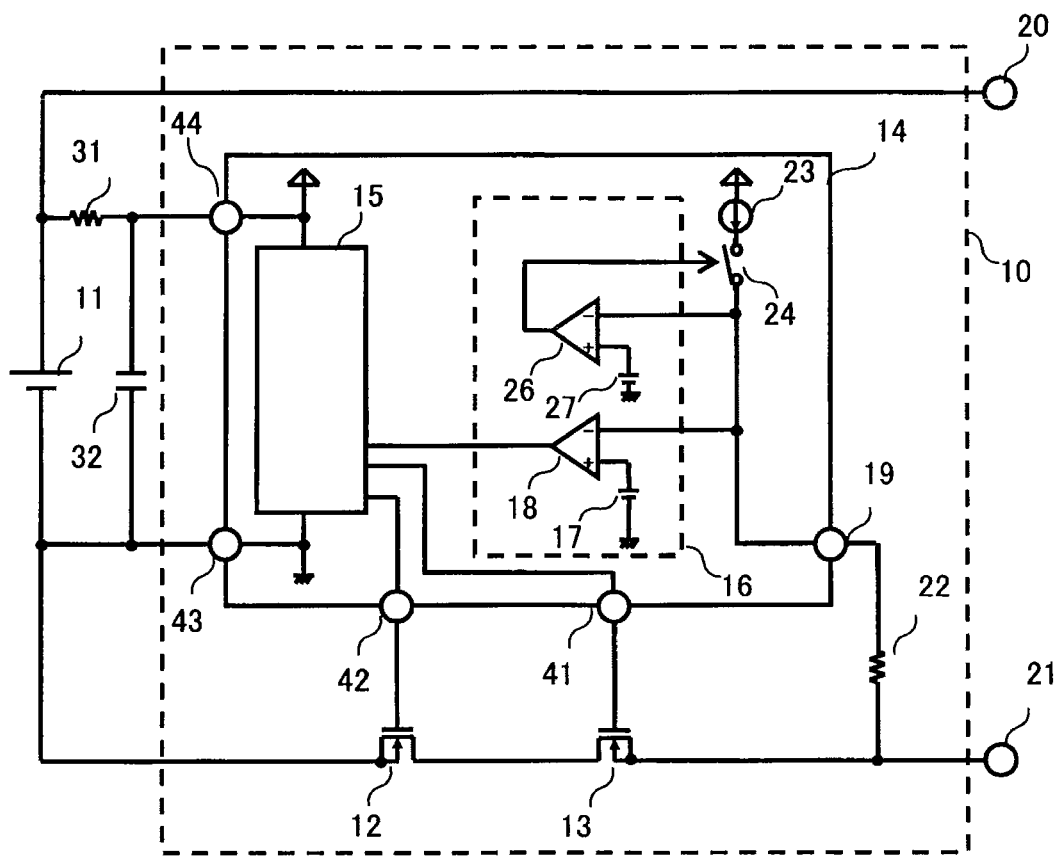
FIG. 2 is a circuit diagram of a battery device according to a second embodiment of the present invention.

FIG. 2 is a circuit diagram of a battery device according to a second embodiment of the present invention. The battery device of the second embodiment differs from the battery device of the first embodiment in that a switch circuit 24, a comparator circuit 26, and a reference voltage circuit 27 are added.

The comparator circuit 26 has a non-inverting input terminal connected to one terminal of the reference voltage circuit 27, an inverting input terminal connected to the overcurrent detecting terminal 19, and an output terminal connected to the switch circuit 24 to control on and off of the switch circuit 24. The other terminal of the reference voltage circuit 27 is connected to the negative electrode power supply terminal 43. One terminal of the switch circuit 24 is connected to the constant current circuit 23, and the other terminal thereof is connected to the overcurrent detecting terminal 19. The remaining connection is similar to that in the first embodiment.

Next, an operation of the battery device of the second embodiment is described. When a load is not connected between the external terminals 20 and 21 and a discharge current does not flow, the comparator circuit 26 performs control to turn off the switch circuit 24 to interrupt the current flowing from the constant current circuit 23. In this manner, when a discharge current does not flow, the current from the constant current circuit 23 can be interrupted to reduce power consumption.

When a load is connected between the external terminals 20 and 21 and a discharge current flows, a potential difference is generated between the negative electrode of the secondary battery 11 and the external terminal 21. This potential difference is determined based on the current amount I1 flowing between the external terminals 20 and 21, the resistance value R12 of the N-channel discharge control field effect transistor 12, and the resistance value R13 of the N-channel charge control field effect transistor 13, and is represented by I1×(R12+R13).

When the potential difference between the negative electrode of the secondary battery 11 and the external terminal 21 increases to be higher than the voltage of the reference voltage circuit 27, the comparator circuit 26 outputs, from the output terminal, a signal for turning on the switch circuit 24. When the switch circuit 24 is turned on, the current of the constant current circuit 23 flows through a path starting from the positive electrode of the secondary battery via the resistor 31, the positive electrode power supply terminal 44, the switch circuit 24, the overcurrent detecting terminal 19, the resistor 22, the N-channel charge control field effect transistor 13, and the N-channel discharge control field effect transistor 12 to reach the negative electrode of the secondary battery. Therefore, the overcurrent detecting terminal 19 has a voltage obtained by adding, to the voltage of the external terminal 21, a voltage generated when the current from the constant current circuit 23 flows through the resistor 22. The comparator circuit 18 compares the voltage of the reference voltage circuit 17 with the voltage of the overcurrent detecting terminal 19. When the voltage of the overcurrent detecting terminal 19 is higher, the comparator circuit 18 outputs a detection signal to the control circuit 15 to turn off the N-channel discharge control field effect transistor 12 for overcurrent protection.

A setting value of an overcurrent detection current value is represented by IDOP, a voltage of the reference voltage circuit 17 is represented by V17, a current value of the constant current circuit 23 is represented by I23, a resistance value of the resistor 22 is represented by R22, a resistance value of the N-channel discharge control field effect transistor 12 is represented by R12, and a resistance value of the N-channel charge control field effect transistor 13 is represented by R13. A voltage of the external terminal 21 as a threshold voltage for the comparator circuit 18 to output a detection signal is represented by V17−(I23×R22). At this time, the current flowing between the external terminals 20 and 21 is obtained by dividing the voltage of the external terminal 21 by the sum of the resistance values of the N-channel discharge control field effect transistor 12 and the N-channel charge control field effect transistor 13, and is represented by IDOP=(V17−(I23×R22))/(R12+R13). From this expression, it is understood that the setting value IDOP of the overcurrent detection current value can be adjusted by changing the resistance value R22 of the resistor 22. In this manner, the resistance value R22 of the resistor 22 is optimized so that IDOP becomes the setting value with respect to fluctuations of the voltage V17 of the reference voltage circuit 17, the resistance value R12 of the N-channel discharge control field effect transistor 12, and the resistance value R13 of the N-channel charge control field effect transistor 13. Thus, the accuracy of the overcurrent detection current value of the battery device can be improved.

Note that, the N-channel discharge control field effect transistor 12 and the N-channel charge control field effect transistor 13 are used in the description, but the present invention is not limited to this configuration. It is needless to say that, even when P-channel field effect transistors are used, and the constant current circuit 23 is connected to the negative electrode power supply terminal 43 instead of the positive electrode power supply terminal 44, a similar operation is enabled. Further, it is apparent that, even when merely the battery discharge current is controlled or when merely the battery charge current is controlled, the present invention is applicable.

As described above, the battery device of the second embodiment can interrupt the current of the constant current circuit 23 when a discharge current does not flow, to thereby reduce power consumption. Further, the resistance value of the resistor 22 is optimized, to thereby improve the accuracy of the overcurrent detection current value of the battery device and enhance the safety of the battery device.

Third Embodiment

Figure 3:
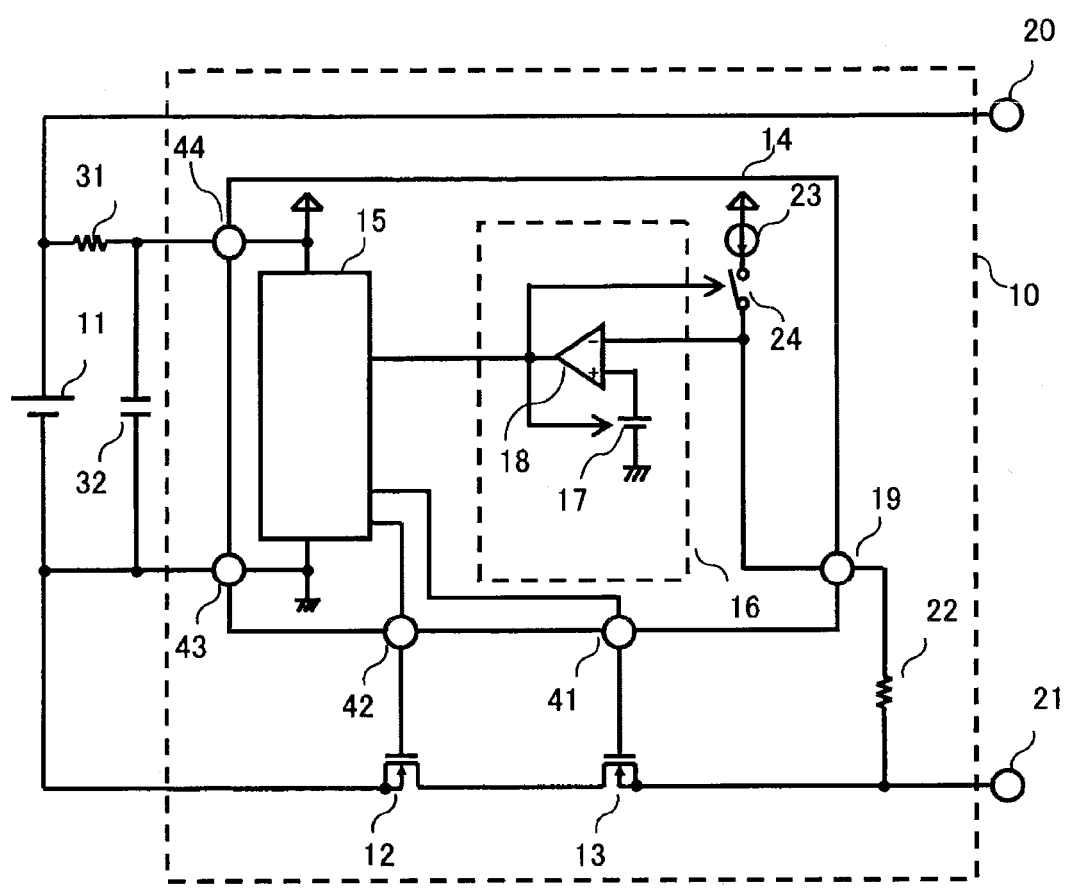
FIG. 3 is a circuit diagram of a battery device according to a third embodiment of the present invention.

FIG. 3 is a circuit diagram of a battery device according to a third embodiment of the present invention. The battery device of the third embodiment differs from the battery device of the second embodiment in that the comparator circuit 26 and the reference voltage circuit 27 are eliminated.

The comparator circuit 18 has an inverting input terminal connected to the overcurrent detecting terminal 19, a non-inverting input terminal connected to the reference voltage circuit 17, and an output terminal connected to the switch circuit 24 and the reference voltage circuit 17. The comparator circuit 18 controls, by the detection signal output from the output terminal, on and off of the switch circuit 24 and the voltage of the reference voltage circuit 17.

Next, an operation of the battery device of the third embodiment is described. When a load is not connected between the external terminals 20 and 21 and a discharge current does not flow, the comparator circuit 18 performs control to turn off the switch circuit 24 to interrupt the current flowing from the constant current circuit 23, to thereby set the voltage of the reference voltage circuit 17 to a low voltage V17A. In this manner, when a discharge current does not flow, the current from the constant current circuit 23 can be interrupted to reduce power consumption.

When a load is connected between the external terminals 20 and 21 and a discharge current flows, a potential difference is generated between the negative electrode of the secondary battery 11 and the external terminal 21. This potential difference is determined based on the current amount I1 flowing between the external terminals 20 and 21, the resistance value R12 of the N-channel discharge control field effect transistor 12, and the resistance value R13 of the N-channel charge control field effect transistor 13, and is represented by I1×(R12+R13).

When the potential difference between the negative electrode of the secondary battery 11 and the external terminal 21 increases to be higher than the voltage V17A of the reference voltage circuit 17, the comparator circuit 26 outputs, from the output terminal, a signal for turning on the switch circuit 24 and for setting the voltage of the reference voltage circuit 17 to a high voltage V17B. The current at this time is assumed as IA. When the switch circuit 24 is turned on, the current of the constant current circuit 23 flows through a path starting from the positive electrode of the secondary battery via the resistor 31, the positive electrode power supply terminal 44, the switch circuit 24, the overcurrent detecting terminal 19, the resistor 22, the N-channel charge control field effect transistor 13, and the N-channel discharge control field effect transistor 12 to reach the negative electrode of the secondary battery. Therefore, the overcurrent detecting terminal 19 has a voltage obtained by adding, to the voltage of the external terminal 21, a voltage generated when the current from the constant current circuit 23 flows through the resistor 22. The comparator circuit 18 compares the voltage V17B of the reference voltage circuit 17 with the voltage of the overcurrent detecting terminal 19. When the voltage of the overcurrent detecting terminal 19 is higher, the comparator circuit 18 outputs a detection signal to the control circuit 15 to turn off the N-channel discharge control field effect transistor 12 for overcurrent protection. The current at this time is assumed as IB.

A setting value of an overcurrent detection current value is represented by IDOP, a voltage of the reference voltage circuit 17 is represented by V17B, a current value of the constant current circuit 23 is represented by I23, a resistance value of the resistor 22 is represented by R22, a resistance value of the N-channel discharge control field effect transistor 12 is represented by R12, and a resistance value of the N-channel charge control field effect transistor 13 is represented by R13. A voltage of the external terminal 21 as a threshold voltage for the comparator circuit 18 to output a detection signal is represented by V17B−(I23×R22). At this time, the current flowing between the external terminals 20 and 21 is obtained by dividing the voltage of the external terminal 21 by the sum of the resistance values of the N-channel discharge control field effect transistor 12 and the N-channel charge control field effect transistor 13, and is represented by IDOP=(V17B−(I23×R22))/(R12+R13). From this expression, it is understood that the setting value IDOP of the overcurrent detection current value can be adjusted by changing the resistance value R22 of the resistor 22. In this manner, the resistance value R22 of the resistor 22 is optimized so that IDOP becomes the setting value with respect to fluctuations of the voltage V17B of the reference voltage circuit 17, the resistance value R12 of the N-channel discharge control field effect transistor 12, and the resistance value R13 of the N-channel charge control field effect transistor 13. Thus, the accuracy of the overcurrent detection current value of the battery device can be improved.

When the current flowing between the external terminals 20 and 21 is IA or more, the comparator circuit 18 outputs a detection signal to change the voltage of the reference voltage circuit 17 to V17B. Thus, the switch circuit 24 is turned on. In this state, the charge and discharge control circuit 14 monitors the magnitude difference between IB and the current flowing between the external terminals 20 and 21.

When the current flowing between the external terminals 20 and 21 is IA or more and less than IB, the charge and discharge control circuit 14 monitors the magnitude difference between IB and the current flowing between the external terminals 20 and 21. The detection signal of the comparator circuit 18 is not output, and hence the voltage of the reference voltage circuit 17 becomes V17A. Thus, the switch circuit 24 is turned off.

Then, the charge and discharge control circuit 14 monitors again the magnification difference between IA and the current flowing between the external terminals 20 and 21.

After that, the comparator circuit 18 outputs again a detection signal. Thus, the voltage of the reference voltage circuit 17 becomes V17B, and thus the switch circuit 24 is turned on. By repeating this operation, the output signal of the comparator circuit 18 oscillates. Therefore, a delay circuit is used inside the control circuit 15 to provide a delay time period so as to prevent overcurrent protection during oscillation of the comparator circuit 18. In this manner, when the current flowing between the external terminals 20 and 21 is IA or more and less than IB, overcurrent protection is prevented. Thus, the overcurrent detection current value IDOP of the battery device of the third embodiment is equal to IB.

Note that, the N-channel discharge control field effect transistor 12 and the N-channel charge control field effect transistor 13 are used in the description, but the present invention is not limited to this configuration. It is needless to say that, even when P-channel field effect transistors are used, and the constant current circuit 23 is connected to the negative electrode power supply terminal 43 instead of the positive electrode power supply terminal 44, a similar operation is enabled. Further, it is apparent that, even when merely the battery discharge current is controlled or when merely the battery charge current is controlled, the present invention is applicable.

As described above, the battery device of the third embodiment can interrupt the current of the constant current circuit 23 when a discharge current does not flow, to thereby reduce power consumption. This operation is carried out with a small-scale circuit, and hence the number of circuits is small and the cost is low. Further, the resistance value of the resistor 22 is optimized, to thereby improve the accuracy of the overcurrent detection current value of the battery device and enhance the safety of the battery device.

Fourth Embodiment

Figure 4:
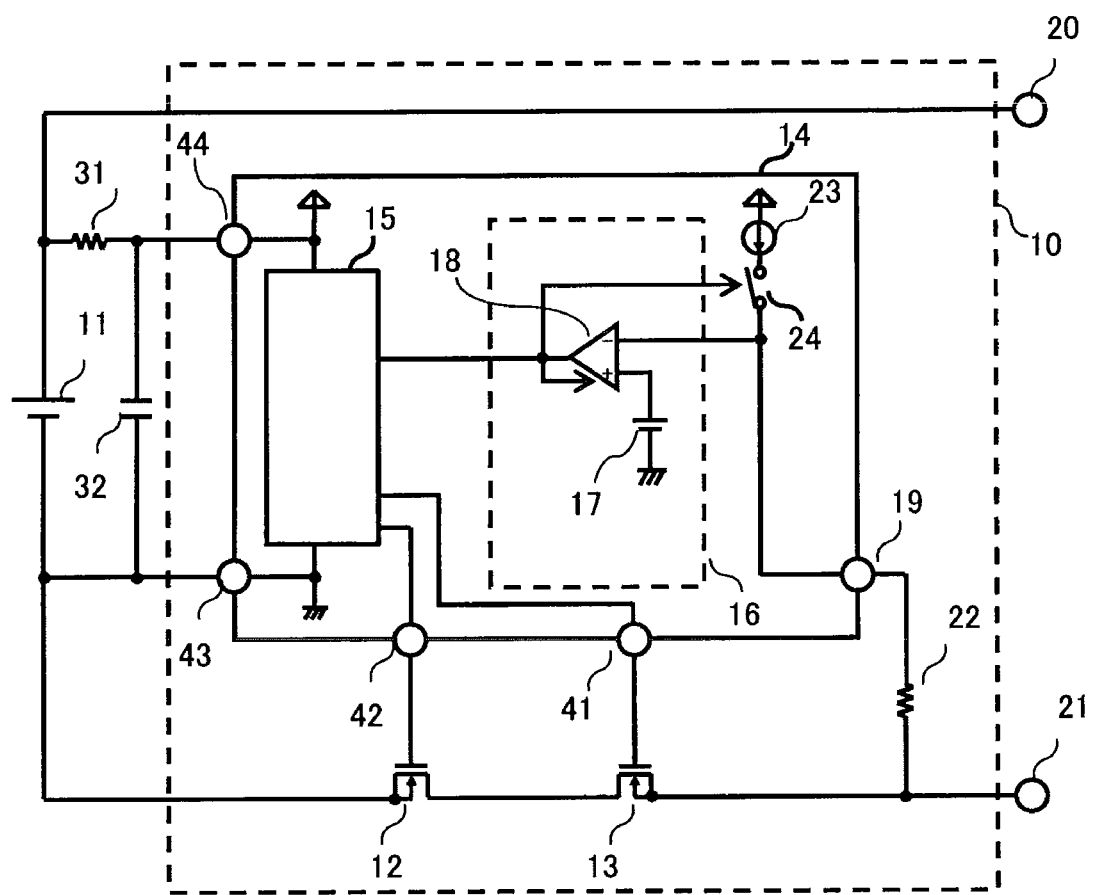
FIG. 4 is a circuit diagram of a battery device according to a fourth embodiment of the present invention.

FIG. 4 is a circuit diagram of a battery device according to a fourth embodiment of the present invention. The battery device of the fourth embodiment differs from the battery device of the third embodiment in that an offset voltage of the comparator circuit 18 can be changed by the detection signal of the comparator circuit 18.

Next, an operation of the battery device of the fourth embodiment is described. When a load is not connected between the external terminals 20 and 21 and a discharge current does not flow, the comparator circuit 18 performs control to turn off the switch circuit 24 to interrupt the current flowing from the constant current circuit 23. In this manner, the offset voltage applied to the non-inverting input terminal of the comparator circuit 18 is set to a low voltage V18A. Thus, when a discharge current does not flow, the current from the constant current circuit 23 is interrupted to reduce power consumption.

When a load is connected between the external terminals 20 and 21 and a discharge current flows, a potential difference is generated between the negative electrode of the secondary battery 11 and the external terminal 21. This potential difference is determined based on the current amount I1 flowing between the external terminals 20 and 21, the resistance value R12 of the N-channel discharge control field effect transistor 12, and the resistance value R13 of the N-channel charge control field effect transistor 13, and is represented by I1×(R12+R13).

When the potential difference between the negative electrode of the secondary battery 11 and the external terminal 21 increases to be higher than V17+V18A which is obtained by adding, to the voltage V17 of the reference voltage circuit 17, the offset voltage V18A applied to the non-inverting input terminal of the comparator circuit 18, the comparator circuit 26 outputs, from the output terminal, a signal for turning on the switch circuit 24 and for setting the offset voltage applied to the non-inverting input terminal of the comparator circuit 18 to the high voltage V18A.

The current at this time is assumed as IA. When the switch circuit 24 is turned on, the current of the constant current circuit 23 flows through a path starting from the positive electrode of the secondary battery via the resistor 31, the positive electrode power supply terminal 44, the switch circuit 24, the overcurrent detecting terminal 19, the resistor 22, the N-channel charge control field effect transistor 13, and the N-channel discharge control field effect transistor 12 to reach the negative electrode of the secondary battery. Therefore, the overcurrent detecting terminal 19 has a voltage obtained by adding, to the voltage of the external terminal 21, a voltage generated when the current from the constant current circuit 23 flows through the resistor 22. The comparator circuit 18 compares the voltage V17 of the reference voltage circuit 17 with the voltage of the overcurrent detecting terminal 19. When the voltage of the overcurrent detecting terminal 19 is higher, the comparator circuit 18 outputs a detection signal to the control circuit 15 to turn off the N-channel discharge control field effect transistor 12 for overcurrent protection. A current at this time is assumed as IB.

A setting value of an overcurrent detection current value is represented by IDOP, a voltage of the reference voltage circuit 17 is represented by V17, a current value of the constant current circuit 23 is represented by I23, a resistance value of the resistor 22 is represented by R22, a resistance value of the N-channel discharge control field effect transistor 12 is represented by R12, and a resistance value of the N-channel charge control field effect transistor 13 is represented by R13. Then, a voltage of the external terminal 21 as a threshold voltage for the comparator circuit 18 to output a detection signal is represented by V17−(I23×R22). At this time, the current flowing between the external terminals 20 and 21 is obtained by dividing the voltage of the external terminal 21 by the sum of the resistance values of the N-channel discharge control field effect transistor 12 and the N-channel charge control field effect transistor 13, and is represented by IDOP=(V17−(I23×R22))/(R12+R13). From this expression, it is understood that the setting value IDOP of the overcurrent detection current value can be adjusted by changing the resistance value R22 of the resistor 22. In this manner, the resistance value R22 of the resistor 22 is optimized so that IDOP becomes the setting value with respect to fluctuations of the voltage V17 of the reference voltage circuit 17, the resistance value R12 of the N-channel discharge control field effect transistor 12, and the resistance value R13 of the N-channel charge control field effect transistor 13. Thus, the accuracy of the overcurrent detection current value of the battery device can be improved.

When the current flowing between the external terminals 20 and 21 is IA or more, the comparator circuit 18 outputs a detection signal to change the offset voltage applied to the non-inverting input terminal of the comparator circuit 18 to V18A. Thus, the switch circuit 24 is turned on. In this state, the charge and discharge control circuit 14 monitors the magnitude difference between IB and the current flowing between the external terminals 20 and 21.

When the current flowing between the external terminals 20 and 21 is IA or more and less than IB, the charge and discharge control circuit 14 monitors the magnitude difference between IB and the current flowing between the external terminals 20 and 21. The detection signal of the comparator circuit 18 is not output, and hence the offset voltage applied to the non-inverting input terminal of the comparator circuit 18 becomes V18A. Thus, the switch circuit 24 is turned off. Then, the charge and discharge control circuit 14 monitors again the magnification difference between IA and the current flowing between the external terminals 20 and 21.

After that, the comparator circuit 18 outputs again a detection signal. Thus, the offset voltage applied to the non-inverting input terminal of the comparator circuit 18 becomes V18A, and thus the switch circuit 24 is turned on. By repeating this operation, the output signal of the comparator circuit 18 oscillates. Therefore, a delay circuit is used inside the control circuit 15 to provide a delay time period so as to prevent overcurrent protection during oscillation of the comparator circuit 18. In this manner, when the current flowing between the external terminals 20 and 21 is IA or more and less than IB, overcurrent protection is prevented. Thus, the overcurrent detection current value IDOP of the battery device of the fourth embodiment is equal to IB.

Note that, description has been made of changing the offset of the non-inverting input terminal of the comparator circuit 18, but the present invention is not limited to this configuration, and a similar operation is enabled even by changing the offset of the inverting input terminal.

In addition, the N-channel discharge control field effect transistor 12 and the N-channel charge control field effect transistor 13 are used in the description, but the present invention is not limited to this configuration. It is needless to say that, even when P-channel field effect transistors are used, and the constant current circuit 23 is connected to the negative electrode power supply terminal 43 instead of the positive electrode power supply terminal 44, a similar operation is enabled.

Further, it is apparent that, even when merely the battery discharge current is controlled or when merely the battery charge current is controlled, the present invention is applicable.

As described above, the battery device of the fourth embodiment can interrupt the current of the constant current circuit 23 when a discharge current does not flow, to thereby reduce power consumption. This operation is carried out with a small-scale circuit, and hence the number of circuits is small and the cost is low. Further, the resistance value of the resistor 22 is optimized, to thereby improve the accuracy of the overcurrent detection current value of the battery device and enhance the safety of the battery device.

Fifth Embodiment

Figure 5:
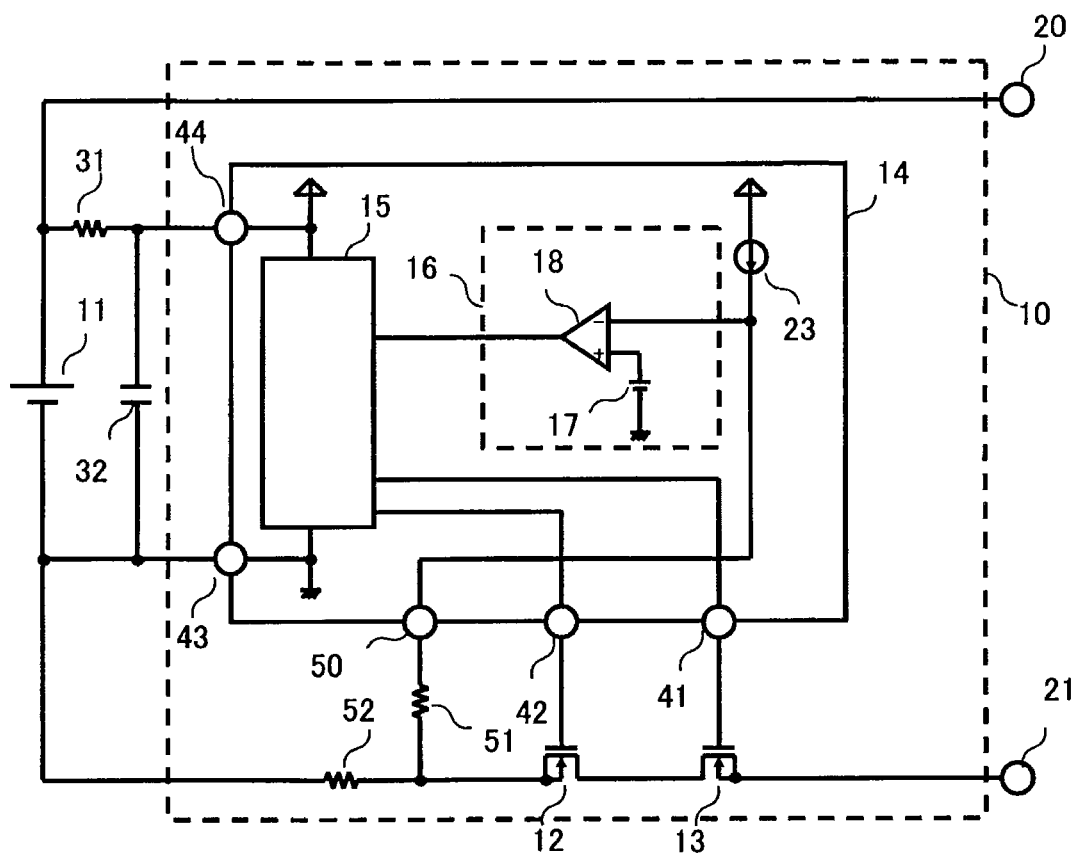
FIG. 5 is a circuit diagram of a battery device according to a fifth embodiment of the present invention.
Figure 6:
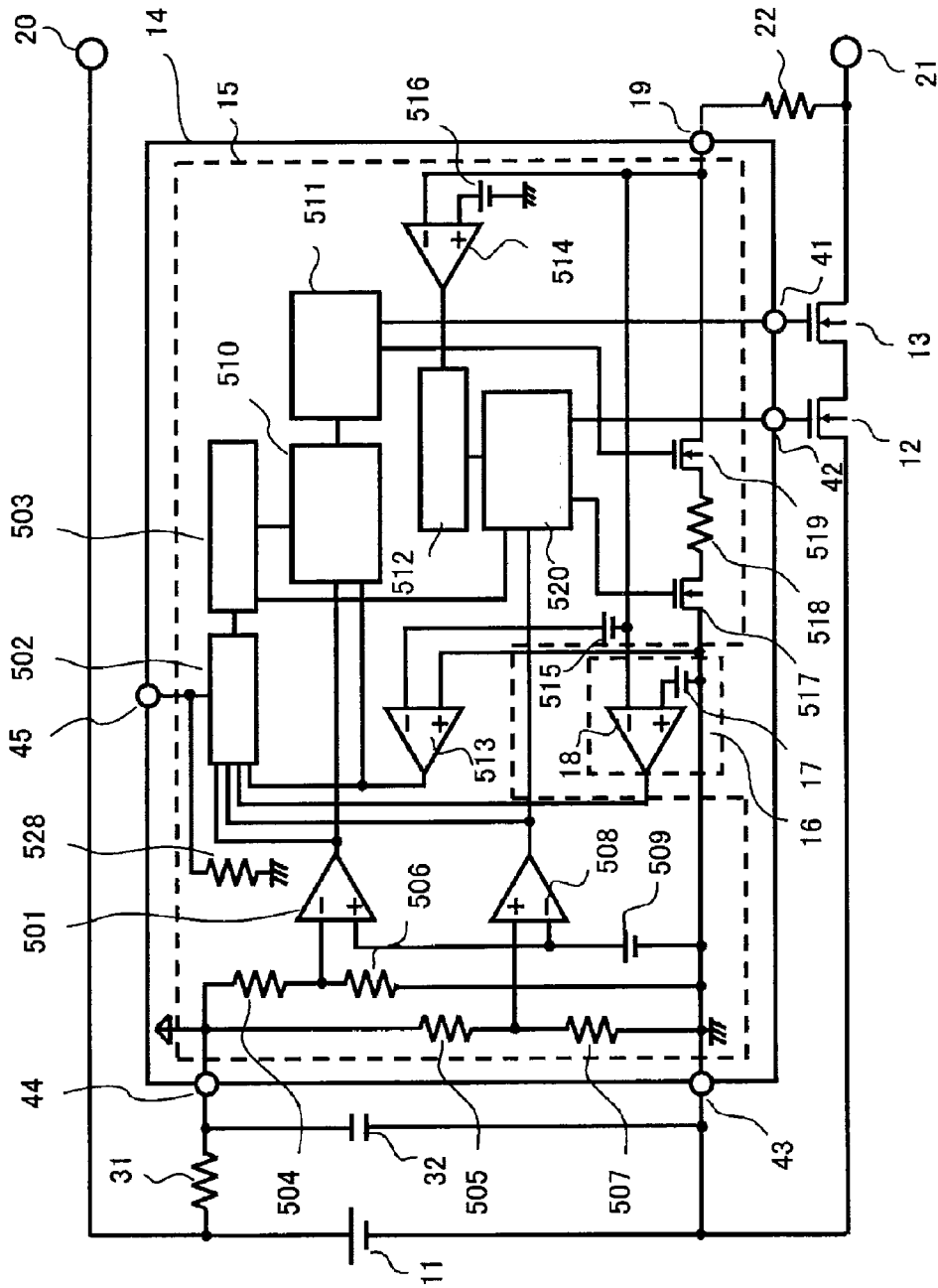
FIG. 6 is a circuit diagram of a related-art battery device.

FIG. 5 is a circuit diagram of a battery device according to a fifth embodiment of the present invention. The fifth embodiment differs from the first embodiment in that the overcurrent detecting terminal of the charge and discharge control circuit 14 is provided as an overcurrent detecting terminal 50, and resistors 51 and 52 are provided inside the charge and discharge control unit 10.

The resistor 52 is connected between the negative electrode of the secondary battery 11 and the source of the N-channel discharge control field effect transistor 12. The resistor 51 is connected between the source of the N-channel discharge control field effect transistor 12 and the overcurrent detecting terminal 50 of the charge and discharge control circuit 14. The constant current circuit 23 is connected between the positive electrode power supply terminal 44 and the overcurrent detecting terminal 50, and the comparator circuit 18 inside the overcurrent detecting circuit 16 compares the voltage of the overcurrent detecting terminal 50 with the voltage of the reference voltage circuit 17.

Next, an operation of the battery device of the fifth embodiment is described. When a load is connected between the external terminals 20 and 21 and a discharge current flows, a potential difference is generated between the two terminals of the resistor 52. This potential difference is determined based on the current amount I1 flowing between the external terminals 20 and 21 and the resistance value R52 of the resistor 52, and is represented by I1×R52.

The current of the constant current circuit 23 flows through a path starting from the positive electrode of the secondary battery via the resistor 31, the positive electrode power supply terminal 44, the overcurrent detecting terminal 50, the resistor 51, and the resistor 52 to reach the negative electrode of the secondary battery. Therefore, the overcurrent detecting terminal 50 has a voltage obtained by adding, to I1/R52, a voltage generated when the current from the constant current circuit 23 flows through the resistor 51. The comparator circuit 18 compares the voltage of the reference voltage circuit 17 with the voltage of the overcurrent detecting terminal 50. When the voltage of the overcurrent detecting terminal 50 is higher, the comparator circuit 18 outputs a detection signal to the control circuit 15 to turn off the N-channel discharge control field effect transistor 12 for overcurrent protection.

A setting value of the overcurrent detection current value is represented by IDOP, a voltage of the reference voltage circuit 17 is represented by V17, a current value of the constant current circuit 23 is represented by I23, a resistance value of the resistor 52 is represented by R52, and a resistance value of the resistor 51 is represented by R51. In this case, a voltage of the resistor 52 as a threshold voltage for the comparator circuit 18 to output a detection signal is represented by V17−(I23×R51). Therefore, IDOP is obtained by dividing the voltage of the resistor 52 by the resistance value of the resistor 52, and is represented by IDOP=(V17−(I23×R51))/R52. From this expression, it is understood that the setting value IDOP of the overcurrent detection current value can be adjusted by changing the resistance value R51 of the resistor 51. In this manner, the resistance value R51 of the resistor 51 is optimized so that IDOP becomes the setting value with respect to fluctuations of the voltage V17 of the reference voltage circuit 17 and the resistance value R52 of the resistor 52. Thus, the accuracy of the overcurrent detection current value of the battery device can be improved.

Note that, the N-channel discharge control field effect transistor 12 and the N-channel charge control field effect transistor 13 are used in the description, but the present invention is not limited to this configuration. It is needless to say that, even when P-channel field effect transistors are used, and the constant current circuit 23 is connected to the negative electrode power supply terminal 43 instead of the positive electrode power supply terminal 44, a similar operation is enabled.

Further, it is apparent that, even when merely the battery discharge current is controlled or when merely the battery charge current is controlled, the present invention is applicable.

As described above, in the battery device of the fifth embodiment, the resistance value of the resistor 51 is optimized, to thereby improve the accuracy of the overcurrent detection current value of the battery device and enhance the safety of the battery device.

What is claimed is:

1. A charge and discharge control circuit for detecting a voltage and abnormality of a secondary battery, the charge and discharge control circuit comprising:
   an overcurrent detecting terminal;
   an overcurrent detecting circuit for detecting overcurrent of the secondary battery, the overcurrent detecting circuit being connected to the overcurrent detecting terminal;
   a resistor connected to the overcurrent detecting terminal;
   a constant current circuit for causing a current to flow to the overcurrent detecting terminal and the resistor;
   wherein the overcurrent detecting circuit compares a reference voltage with a voltage of the overcurrent detecting terminal including a voltage generated by the current flowing through the resistor; and
   wherein the resistance value of the resistor is adjusted to set an overcurrent detection current value at a predetermined setting value and a threshold voltage for the overcurrent detecting circuit to output a detection signal is a voltage having the value of the voltage generated by the current flowing through the resistor subtracted from the reference voltage.

2. A charge and discharge control circuit according to claim 1, wherein the overcurrent detecting circuit comprises:
   a reference voltage circuit; and
   a comparator circuit for comparing a voltage of the overcurrent detecting terminal with a voltage of the reference voltage circuit.

* * * * *